(12) United States Patent
Uto

(10) Patent No.: US 11,013,997 B2
(45) Date of Patent: May 25, 2021

(54) COMPUTER-READABLE NON-TRANSITORY STORAGE MEDIUM, CONTROL METHOD, AND INFORMATION PROCESSING APPARATUS

(71) Applicant: GREE, Inc., Tokyo (JP)

(72) Inventor: Takeshi Uto, Tokyo (JP)

(73) Assignee: GREE, INC., Tokyo (JP)

( * ) Notice: Subject to any disclaimer, the term of this patent is extended or adjusted under 35 U.S.C. 154(b) by 149 days.

(21) Appl. No.: 16/043,331

(22) Filed: Jul. 24, 2018

(65) Prior Publication Data

US 2019/0030430 A1    Jan. 31, 2019

(30) Foreign Application Priority Data

Jul. 25, 2017    (JP) .............................. JP2017-143725

(51) Int. Cl.
*A63F 13/00*     (2014.01)
*A63F 9/24*      (2006.01)
*A63F 13/47*     (2014.01)
*A63F 13/58*     (2014.01)
*A63F 13/822*    (2014.01)
*A63F 13/35*     (2014.01)

(52) U.S. Cl.
CPC .............. *A63F 13/47* (2014.09); *A63F 13/35* (2014.09); *A63F 13/58* (2014.09); *A63F 13/822* (2014.09)

(58) Field of Classification Search
None
See application file for complete search history.

(56) References Cited

U.S. PATENT DOCUMENTS

| 2014/0243089 A1* | 8/2014 | Tsukioka ................ A63F 13/12 463/31 |
| 2014/0274401 A1* | 9/2014 | Oono ....................... A63F 13/58 463/40 |

(Continued)

OTHER PUBLICATIONS

Non-Patent Publication 1—Screen shots of an in-game event called "Dream Castle in Blue Night" held between Apr. 21, 2017 and May 10, 2017 in the online game, "Sword Art Online—Memory Defrag", Bandai Namco Entertainment Inc., (the game was downloadable from the following URLs: https://play.google.com/store/apps/details?id=com.bandainamcoent.saomd; https://itunes.apple.com/jp/app/id1138599575).

(Continued)

*Primary Examiner* — Milap Shah
(74) *Attorney, Agent, or Firm* — Pillsbury Winthrop Shaw Pittman, LLP

(57) ABSTRACT

An information processing apparatus (a server device, a terminal device) for processing of a game in which a user able to select between a first quest and a second quest different from the first quest is caused to perform: a step of advancing the first quest when the user selects the first quest; a first storing step in which an association between a first game medium and a second game medium different from the first game medium is stored in association with the user, the first game medium being set as an object to be operated by the user in the first quest; and a step of advancing the second quest while maintaining the association stored in the first storing step when the user switches from the first quest to the second quest without satisfying a predetermined condition in the first quest.

8 Claims, 11 Drawing Sheets

(56) References Cited

U.S. PATENT DOCUMENTS

| | | | | |
|---|---|---|---|---|
| 2014/0378229 A1* | 12/2014 | Nishimura | ............... | A63F 13/35 |
| | | | | 463/42 |
| 2015/0157941 A1* | 6/2015 | Ando | ....................... | A63F 13/58 |
| | | | | 463/43 |
| 2017/0304734 A1* | 10/2017 | Tatsuke | ................. | A63F 13/537 |
| 2018/0221768 A1* | 8/2018 | Otomo | .................... | A63F 13/69 |

OTHER PUBLICATIONS

Non-Patent Publication 2—Screen shots of an in-game event called "Twilight Castle in The Sky" held between Jun. 8, 2017 and Jul. 2, 2017 in the online game, "Sword Art Online—Memory Defrag", Bandai Namco Entertainment Inc., (the game was downloadable from the following URLs: https://play.google.com/store/apps/details?id=com.bandainamcoent.saomd; https://itunes.apple.com/jp/app/id1138599575).

Non-Patent Publication 3—"Seven tips to fulfill an endless combat quest (infinite dungeon),"[online], Famitsu.com, (posted on Nov. 18, 2016 on the Internet, URL: https://app.famitsu.com/20161118_894506/).

\* cited by examiner

| User ID | Information About Possessed Cards | Information About Possessed Items |
|---|---|---|
| user01 | * * * * | * * * * |
| user02 | * * * * | * * * * |
| user03 | * * * * | * * * * |

| Card ID | Character ID | Level | Rarity | Attribute | Parameter | Equipment | ... |
|---|---|---|---|---|---|---|---|
| 1 | A | 1 | 2 | Fire | HP:1000<br>MP:1000<br>AT:1000<br>DF:1000 | Weapon:W1<br>Armor:P2 | ... |
| 2 | B | 5 | 3 | Water | HP:2000<br>MP:2000<br>AT:2000<br>DF:2000 | Weapon:W2<br>Armor:P1 | ... |
| 3 | C | 10 | 4 | Light | HP:3000<br>MP:3000<br>AT:3000<br>DF:3000 | Weapon:W4<br>Armor:P3 | ... |
| ⋮ | ⋮ | ⋮ | ⋮ | ⋮ | ⋮ | ⋮ | |
| 20 | A | 3 | 4 | Wind | HP:3000<br>MP:3000<br>AT:3000<br>DF:3000 | Weapon:W3<br>Armor:P4 | ... |
| ⋮ | ⋮ | ⋮ | ⋮ | ⋮ | ⋮ | ⋮ | |

115

| Item ID | Item Name | Status | | |
|---|---|---|---|---|
| | | Level | Parameter Adjustment Value | |
| W1 | Sword | 1 | AT:+200 | ... |
| W2 | Knife | 3 | AT:+100<br>HP:+100 | ... |
| W3 | Mace | 4 | AT:+50<br>MP:+100 | ... |
| W4 | Rod | 2 | AT:+70<br>MP:+50 | ... |
| ⋮ | ⋮ | ⋮ | ⋮ | |
| P1 | Shield | 1 | DF:+20 | ... |
| P2 | Plain Clothes | 1 | DF:+10 | ... |
| P3 | Leather Clothes | 2 | DF:+30<br>HP:+20 | ... |
| P4 | Armor | 3 | DF:+50 | ... |
| ⋮ | ⋮ | ⋮ | ⋮ | |

Fig. 4

COMPUTER-READABLE NON-TRANSITORY STORAGE MEDIUM, CONTROL METHOD, AND INFORMATION PROCESSING APPARATUS

CROSS-REFERENCE TO RELATED APPLICATIONS

This application is based on and claims the benefit of priority from Japanese Patent Application Serial No. 2017-143725 (filed on Jul. 25, 2017), the contents of which are hereby incorporated by reference in its entirety.

TECHNICAL FIELD

The present disclosure relates to a computer-readable non-transitory storage medium, a control method, and an information processing apparatus.

BACKGROUND

In recent years, as a type of games distributed through communication networks, known is a so-called "social game" in which players (users) are able to communicate to each other. For example, there are some social games in which a user selects characters to form a deck (team or group) to start a quest.

Which characters should be selected for a deck would be strategically important for users playing such a game. Typically, in a normal quest (regular quest), a user wins a battle when the user satisfies a condition such as the user's character defeats a specific enemy character (for example, a boss character) or all the enemy characters. As an event different from a regular quest, there is a quest (hereunder referred to as a "consecutive battle quest") in which battles are consecutively carried out and a user proceeds sequentially to a next battle after he/she wins a battle. "Seven tips to fulfill an endless combat quest (infinite dungeon)," [online], Famitsu.com, (retrieved on Jun. 22, 2013 on the Internet, URL: https://app.famitsu.com/20161118_894506/) discloses a consecutive battle quest in which a user forms a deck by using characters that the user owns and the user aims to win battles as many as possible.

Here, some consecutive battle quests may limit the number of times that each character joins a battle. In addition, in some consecutive battle quests, a character that has once been incapacitated is not allowed to participate in a battle again. Such limitations in the consecutive battle quests prevent a user from using only particular characters (for example, only characters with high attack scores) in battles among the characters that the user owns. This means that it would be important as a game strategy for a user to determine what timing and which characters should participate in battles (to form a deck) in a consecutive battle quest, Also, users aim to complete a consecutive battle quest using many of game media (characters, items such as weapons and armors, and the like) that the users possess. Therefore, users (non-beginners) who possess a certain amount of game medium may find more interest in the game.

Some games allow users to switch to a regular quest while users are playing a consecutive battle quest. In general users are able to freely change settings concerning characters in a regular quest. However, if a user is allowed to freely change the settings of characters in a regular quest, the user may replace, in the regular quest, a weapon and the like of a character by a weapon and the like of another character which is no longer able to fight in a consecutive battle quest, and then return to the consecutive battle quest again. In this way, even a beginner user could benefit from a specific weapon and the like to advance in the consecutive battle quest. In this respect, the importance of strategy declines, which may hinder enhancement of the attractiveness of the consecutive battle quest.

To address this, weapons and the like which characters possess may be separately set for each quest such as a consecutive battle quest and a regular quest. However, if a user sets weapons and the like of characters for each quest, it is necessary to save each setting in a storage unit. Consequently, a storage capacity necessary for such settings may increase greatly each time a new quest is added.

SUMMARY

In view of the above, an object of the disclosure is to provide a program, a control method, and an information processing apparatus with which such an increase in storage capacity is prevented.

According to one aspect of the embodiment, provided is a computer-readable tangible non-transitory storage medium including executable instructions that, when executed, cause an information processing apparatus for processing of a game in which a user able to select between a first quest and a second quest different from the first quest, to perform: a step of advancing the first quest when the user selects the first quest; a first storing step in which an association between a first game medium and a second game medium different from the first game medium in association with the user, the first game medium being set as an object to be operated by the user in the first quest; and a step of advancing the second quest while maintaining the association stored in the first storing step when the user switches from the first quest to the second quest without satisfying a predetermined condition in the first quest.

According to another aspect of the embodiment, provided is a control method for an information processing apparatus for processing of a game in which a user able to select between a first quest and a second quest different from the first quest. The method includes: a step of advancing the first quest when the user selects the first quest; a first storing step in which an association between a first game medium and a second game medium different from the first game medium in association with the user, the first game medium being set as an object to be operated by the user in the first quest; and a step of advancing the second quest while maintaining the association stored in the first storing step when the user switches from the first quest to the second quest without satisfying a predetermined condition in the first quest.

According to another aspect of the embodiment, provided is an information processing apparatus for processing of a game in which a user able to select between a first quest and a second quest different from the first quest. The information processing apparatus includes a storage unit and a control unit. The control unit causes to: advance the first quest when the user selects the first quest perform a first storing step in which an association between a first game medium and a second game medium different from the first game medium in association with the user, the first game medium being set as an object to be operated by the user in the first quest; and advance the second quest while maintaining the association stored in the first storing step when the user switches from the first quest to the second quest without satisfying a predetermined condition in the first quest.

The disclosure can provide a program, a control method, and a information processing apparatus with which increase in storage capacity is prevented.

BRIEF DESCRIPTION OF THE DRAWINGS

FIG. 4 illustrates an example of information about owned items.

DESCRIPTION OF THE EMBODIMENT

Outline of Game System

Figure 1:
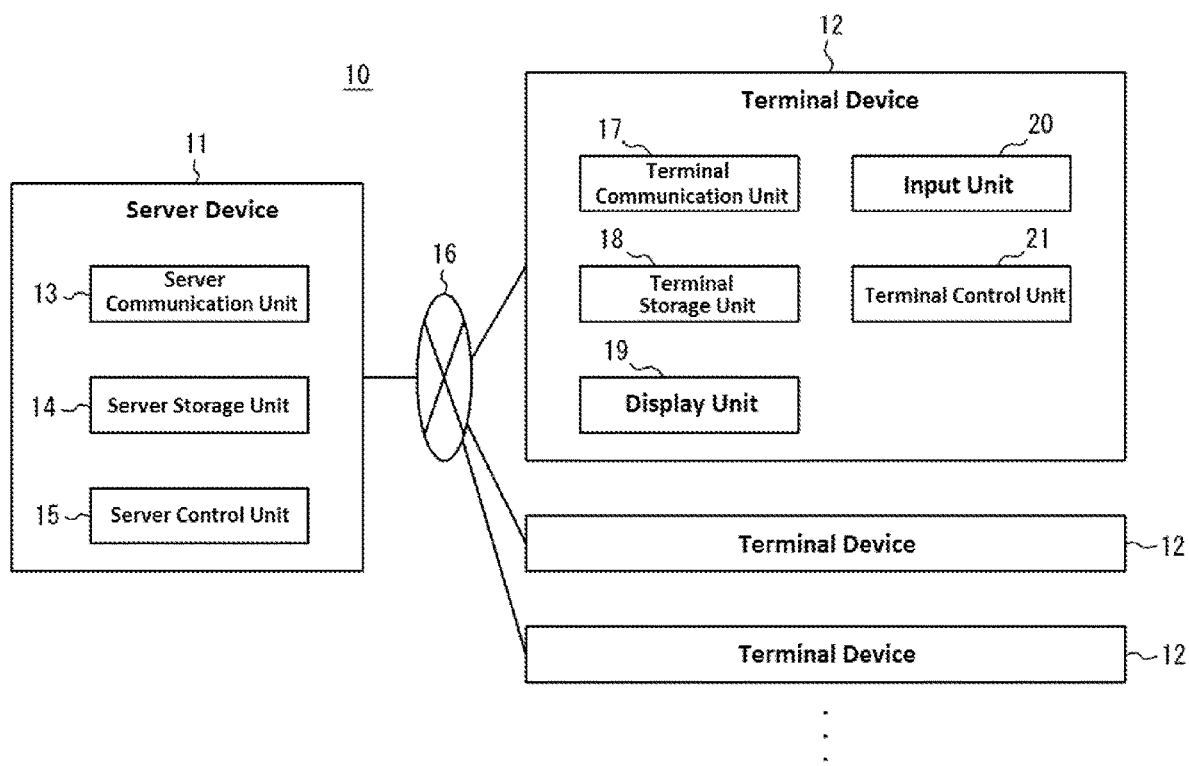
FIG. 1 is a block diagram illustrating a game system that includes an information processing apparatus according to an exemplary embodiment.

Referring to FIG. 1, a game system 10 includes a server device 11 and a plurality of terminal devices 12. Although three terminal devices 12 are shown in FIG. 1 for sake of simplicity, the number of terminal devices 12 may be two or more.

The server device 11 may be an information processing apparatus that is managed by a gaming platform operator. The terminal device 12 may be an information processing apparatus used by a user, such as a mobile phone, a smart phone, a tablet device, a personal computer (PC) and a game machine. The server device 11 and the terminal devices 12 may be interconnected communicably over a network 16 such as the Internet. For example, the server device 11 and the terminal device 12 may perform various processes concerning a game in conjunction with each other.

Outline of Game

A game executed on the game system 10 includes various game contents. At least some of the various game contents may be executed using game mediums.

Game mediums are electronic data that are used for a game and can be acquired, owned, used, managed, exchanged, integrated, reinforced, sold, abandoned, or donated in the game by users. For example, the game medium may be any medium such as a card, an item, a virtual currency, a ticket, a character, an avatar, level information, status information, parameter information (health, attack, and the like), and statics information (skills, abilities, magic, jobs and the like). However, how game mediums are used in a game may not be limited to those described in this specification.

In the following description, unless explicitly stated otherwise, a "game medium owned by a user" refers to a game medium that is possessed by a user and associated with a user ID with which the user can be identified uniquely. "Imparting a game medium to a user" refers to associating the game medium with the user ID as an owned game medium. "Selling a game medium owned by a user" refers to clearing the association between the user ID and the owned game medium and re-associating the user ID with another game medium (such as virtual currency or an item) as the owned game medium.

Game contents refer to contents which users can play in a game. An example of the game contents includes: a quest a mission; a mini game; growing, reinforcing, and compositing game mediums; a game medium acquisition event a virtual space exploration event a fighting event with an opponent (such as another user, an enemy character, and an enemy building), and the like. For example, when it is determined that one or more predetermined game criteria or tasks set for each game content are successfully satisfied, a game medium or the like may be given to a user as a reward. Any task corresponding to game contents such as a task of winning in a battle with an enemy character and a task of reaching a goal point in a virtual space can be adopted as the predetermined game criteria. Completion of a specific task (a task to be cleared) among one or more game tasks set in a game content may also be referred to as clearing of the game content. When a user who plays a game content succeeds in completing a task to be cleared, it may be determined that the user cleared the game content and the game content may be ended.

Various game contents may include single-player game contents and multi-player game contents. The single-player game contents are game contents (for example, game contents played by only one person) executed on the basis of a single user operation on one terminal device 12 used by the user. The terminal device 12 executes single-player game contents alone or in conjunction with the server device 11. On the other hand, multi-player game contents may be game contents (for example, game contents played by more than one person) that are common to two or more users and executed on the basis of users' operations on two or more terminal devices 12 used by the two or more users. Game contents common to two or more users may include, for example, game contents in which at least a part of advancement processing and processing results of the game contents may be commonly applied to the two or more users. Two or more terminal devices 12 may execute a multi-player game content in cooperation or two or more terminal devices 12 and the server device 11 may execute a multi-player game content in cooperation.

In this embodiment, a game includes game contents in which users operate game mediums to battle with an opponent. Hereinafter, such game contents may also be referred to as battle contents. Moreover game mediums that are used for battle contents are hereinafter described as they include, for example, a character that a user owns in the game but the game mediums may not be limited to this. An opponent is hereinafter described as it includes an enemy character such as a non-player character (NPC), but the opponent is not limited to this. For example, in multi-player game contents, a game medium that is operated by another user may be set as an opponent.

For example, in a battle content according to the embodiment, a user selects a predetermined number of characters from among the characters that the user owns. Here, the user may be able to select a help character (also referred to as a "helper"). By using the help character, it is possible to enhance a battle capability of a deck. The help character may be a character associated with a game medium (a card, for example) which another user possesses or a character provided by a game program. The user uses a part or all of the characters in the deck to battle with an enemy character. Here, organizing a deck means making a party (team or group) that is used for a battle by selecting characters from among the characters which a user owns.

Configuration of Server Device

The server device 11 includes a server communication unit 13, a server storage unit 14, and a server control unit 15.

The server communication unit 13 includes an interface that communicates with an external device in a wired or wireless manner and transmits and receives information. The server communication unit 13 may include, for example, a wireless local area network (LAN) communication module or a wired LAN communication module. The server communication unit 13 can transmit and receive information to and from the terminal devices 12 over the network 16.

The server storage unit 14 may include, for example, a primary storage device and a secondary storage device. For example, the server storage unit 14 may include a semiconductor memory, a magnetic memory, an optical memory, or the like. The server storage unit 14 may store various pieces of information and programs that may be necessary for provision and control of a game. At least a part of the information and programs stored in the server storage unit 14 may be shared and synchronized with the terminal devices 12. For example, the server storage unit 14 stores information concerning one or more users.

The server storage unit 14 may store information about enemy characters. Enemy character are used as opponents of the characters that a user uses in battles. The information about enemy characters include any information concerning the enemy characters. For example, the information about an enemy character may include a character ID that identifies the enemy character uniquely, level, attribute, HP (hit points), MP (magic points), AT (attack), DF (defense) and the like.

The server control unit 15 may include at least one of one or more general-purpose processors for realizing a specific function with a specific program read therein and one or more dedicated processors that are specialized for specific processing. The server control unit 15 controls the operation of the server device 11 as a whole.

The server control unit 15 stores various types of information and programs required for processing a game in the server storage unit 14. Information required for processing a game may include the above-mentioned information concerning a user(s), the information concerning an enemy character(s), information required for execution of a battle (s), and the like.

The server control unit 15 perform transmission and reception of information via the server communication unit 13. For example, the server control unit 15 may transmit at least a part of information stored in the server storage unit 14 to the terminal device 12. In this way, the information stored in the server storage unit 14 and the information stored in the terminal device 12 may be shared and synchronized with each other. A timing at which sharing and synchronization of the information is performed may be, for example, when new information is stored in the server storage unit 14, when information stored in the server storage unit 14 is updated, but may be any predetermined timing.

The server control unit 15 may perform processing of a game in conjunction with the terminal device 12. The processing of a game may include, for example, a processing in which a user acquires a game medium as the user advances a game scenario. The game medium may be a card or a character associated with a card. The processing of a game may also include processing to perform exchange, sale, composite or the like of the acquired card. The processing of a game may further include processing to organize a deck of characters associated with the cards and battle against an enemy character.

Configuration of Terminal Device

As shown in FIG. 1, the terminal device 12 includes a terminal communication unit 17, a terminal storage unit 18, a display unit 19, an input unit 20, and a terminal control unit 21.

The terminal communication unit 17 includes an interface that communicates with an external device in a wired or wireless manner and transmits and receives information. The terminal communication unit 17 may include a wireless communication module that conforms with a mobile communication standard such as Long Term Evolution (LTE) (registered trademark), a wireless LAN communication module, a wired LAN communication module, or the like. The terminal communication unit 17 can transmit and receive information to and from the terminal devices 11 over the network 16.

The terminal storage unit 18 may include, for example, a primary storage device and a secondary storage device. For example, the terminal storage unit 18 may include a semiconductor memory, a magnetic memory, an optical memory, or the like. The terminal storage unit 18 stores various types of information and programs necessary for processing of a game. For example, the terminal storage unit 18 may store all or a part of the above-mentioned information concerning a user. All or a part of such information may be transmitted and received to/from the server device 11, for example, by the terminal control unit 21.

The display unit 19 may include a display device such as a liquid crystal display and an organic EL display. The display unit 19 is capable of displaying various screens.

The input unit 20 may include, for example, an input interface such as a touch panel installed integrally with the display unit 19. The input unit 20 can receive a user input to the terminal device 12. The input unit 20 may include physical keys or may additionally include any input interface such as a pointing device like a mouse.

The terminal control unit 21 may include at least one of one or more general-purpose processors for realizing a specific function with a specific program read therein and one or more dedicated processors that are specialized for specific processing. The terminal control unit 21 controls the operation of the terminal device 12 as a whole.

The terminal control unit 21 transmits and receives information via the terminal communication unit 17. For example, the terminal control unit 21 receives information necessary for processing of a game from the server device 11. The terminal control unit 21 may store the information received from the server device 11 in the terminal storage unit 18. The terminal control unit 21 may transmit the information stored in the terminal storage unit 18 to the server device 11.

The terminal control unit 21 starts an application of a game in response to an operation of a user. The terminal control unit 21 may perform processing of a game in conjunction with the server device 11. For example, the terminal control unit 21 may display various screens on the display unit 19. For example, a Graphic User Interface (GUI) is shown on a screen. The terminal control unit 21 can detect a user operation performed on the screen.

Information Stored in Storage Unit

Figure 2:
FIG. 2 illustrates an example of information concerning users.

FIG. 2 illustrates information 110 concerning users including at least three users. The information 110 concerning users may be stored in, for example, the server storage unit 14 and shared and synchronized. The Information 110 concerning users may include various types of information regarding users. In this embodiment, the information 110 concerning users includes user IDs, information 111 about owned cards (see FIG. 3), and information 115 about owned items (see FIG. 4). In other words, the information 110 concerning users associates the information 111 about owned cards and the information 115 about owned items with corresponding users.

A user ID is information that uniquely identify a user as described above.

The information 111 about owned cards includes various information about cards that a user owns in a game. When a card is acquired by a user, the acquired card is associated with the user. In this embodiment, cards are character cards. Accordingly, the information 111 about owned cards includes information about types and characteristics of characters associated with the cards.

The information 115 about owned items includes various information about items that a user owns in a game. When an item is acquired by a user, the acquired item is associated with the user. In the embodiment, items include equipment to be worn by characters (more specifically, weapons, armor and the like). Here, the items are not limited to those worn by characters. For example, the items may include medicines that restore or raise a parameter(s) of characters, accessories and the like.

Figure 3:
FIG. 3 illustrates an example of information about owned cards.

FIG. 3 illustrates an example of the information 111 about owned cards in detail. The information 111 about cards owned by a user is illustrated in FIG. 3. The information 111 about owned cards include information concerning card ID, character ID, level, rarity, attribute, parameter, and equipment. The information 111 about owned cards is not limited to those including all of these data. The information 111 about owned cards may further include other data. For example, the information 111 about owned cards may include data of a special attack (so-called skill) different from a normal attack associated with a card.

The card ID is an ID for uniquely identifying a card owned by a user. In the example of FIG. 3, unique numbers are used as the card IDs. Hereinafter, a card whose card ID is 1 is denoted as a "card 1."

The character ID is an ID for uniquely identifying a character in a game. Since the cards are character cards in the embodiment, one card ID is associated with one character ID. In the example of FIG. 3, non-overlapping alphabets are used as the character IDs. Hereinafter, a character whose character ID is A is denoted as a "character A". Here, one character may correspond to more than one card. In the example of FIG. 3, the card 1 and a card 20 are both cards of the character A.

The level is information indicating the degree of growth of a user character. For example, larger a value of the level is, the degree of growth of the user character is high. A value of the level affects, for example, a value of a parameter(s). In the example of FIG. 3, the level of a character C is 10. A value of the level is raised as a user develops a character. For example, a user is able to grow a character by completing a game content (for example, a quest) with the character, crossing the character with an item or another character or the like.

The rarity is information indicating the degree of scarcity of a card. For example, higher a value of the rarity is, greater the degree of scarcity of the card is. The rarity may be fixed for each card. Alternatively, each card may have an initial value of the reality and it may be changed in accordance with user's plays of the game. The rarity affects, for example, a maximum value of a parameter(s). In the example of FIG. 3, the rarity is represented by a number. For example, the card 1 and the card 20 both have the character A. However, the degree of the rarity of the card 20 whose rarity is 4 is higher than that of the card 1 whose reality is 2. Alternatively, each character may have a predetermined level of the rarity.

The attribute is information indicating a superiority-inferiority relationship between characters fighting each other. In the example of FIG. 3, the attribute is represented by elements such as fire, water, wind, and light. For example, a character with a fire attribute may have a high resistant against attack from a character with a wind attribute and may be weak against attack from a character with a water attribute.

The parameter is information indicating the strength of a character referenced in a battle in a game. In the embodiment, each character has parameters of HP (hit points), MP (magic points), AT (attack), and DF (defense). Here, the parameters are not limited to HP, MP, AT, and DF. The parameters may further include parameters involving behavior in the game such as agility, for example. Also, the parameters may not include any of HP, MP, AT, and DF.

HP is information indicating character's hit points (a health value). In FIG. 3, the maximum value of HP is shown. For example, when a character receive a damage from an offensive action of an enemy character, HP is lowered by an amount equivalent to the damage. Moreover, HP can be restored by an amount equivalent to, for example, a recovery action which the character performed Unless HP of a character reaches zero, the character is capable of participate in a battle and, for example, it can attack an enemy character. However, when HP decreases to zero, the character is incapacitated and can no longer fight in the battle. The larger the character's HP is, the more advantageous for a player to clear a game content.

MP is information indicating character's magic points. In FIG. 3, the maximum value of MP is shown. For example, if a character has a skill, the MP decreases by the amount determined for the skill when the skill is activated. The larger the character's MP is, the more advantageous for a player to clear a game content.

AT is information indicating an offensive strength of a character. AT affects, for example, the amount of damage given to an opponent by a character's attack. The larger the value of AT is, the greater the amount of damage given to an opponent. Therefore, the larger the character's AT is, the more advantageous for a player to clear a game content.

DF is information indicating a defensive strength of a character. DF affects, for example, the amount of damage inflicted on the character by an opponent's attack. The larger the value of AT is, the greater the amount of damage given to an opponent is. Therefore, the larger the character's DF is, the more advantageous for a user to clear a game content.

Here, the values of HP, MP, AT, and DF of each character shown in FIG. 3 are merely an example. HP, MP, AT, and DF are independent parameters and each may be set separately. In the example of FIG. 3, the values of HP, MP, AT, and DF before adjustment taking equipment worn by the character into consideration (the values of the character itself) are shown. Alternatively, the parameters may indicate the adjusted values of HP, MP, AT, and DF taking the equipment worn by the character into consideration.

The equipment is information indicating the equipment worn by the character of the card. In the example of FIG. 3, each character is allowed to be equipped with a weapon(s) and armor. Here, at least some characters may be allowed to be equipped with other equipment (for example, an accessory). Alternatively, at least some of the characters may not be allowed to be equipped with a weapon or armor.

A weapon and armor worn by a character of each card are indicated by an item ID (see FIG. 4) that uniquely identifies an item. Here, there may be a character(s) that does not have (unequipped with) at least one of a weapon or armor. In the embodiment, when a weapon is equipped, at least the AT is increased among the parameters of a character. In the embodiment, when armor is equipped, at least the DF is increased among the parameters of a character. Hereinafter, a weapon whose item ID is W1 is expressed as a "weapon W1". Also, armor whose item ID is P1 is expressed as "armor P1". In the example of FIG. 3, the character A is equipped with the weapon W1 and an armor P2. Accordingly, the AT of the character A is increased by a parameter adjustment value of the weapon W1. The DF of the character A is increased by a parameter adjustment value of the armor P2.

FIG. 4 illustrates an example of the information 115 about owned items in detail. The information 115 about items owned by a single user is shown in FIG. 4. The information 115 about owned items includes data on the item ID, an item name, level, and a parameter adjustment value. The level and the parameter adjustment value may change in accordance with advancement of a game. In the embodiment, the status of an item includes the level and the parameter adjustment value. The information 115 about owned items is not limited to those including all of these data. The information 115 about owned items may further include other data. For example, the information 115 about owned items may include information about characters allowed to be equipped with the items and the like. Further, the status is not limited to the level and the parameter adjustment value.

The item ID is an ID for uniquely identifying an item owned by a user. In the example of FIG. 4, non-overlapping characters are used as the item IDs. In the example of FIG. 4, an item whose item ID starts with "W" is a weapon. An item whose item ID starts with "P" is armor.

The item name is a name of an item. The item names are used in a list of items that can be equipped. The list is shown, for example, when an equipment change button is pressed on a team screen (see FIG. 10). In the example of FIG. 4, a weapon W2 is a knife. A weapon W4 is a rod. Armor P1 is a shield. Armor P3 is leather clothes. In the embodiment, the item names are distinct from each other. Therefore, each item name corresponds to a unique item ID. Alternatively, a plurality of item IDs may correspond to one item name.

The status is information indicating the strength of an item referred in a battle and the like in a game. Level is a type of the status. The level is information indicating how much an item is upgraded. For example, larger a value of the level is, the degree of upgrades of the item is high. For example, the value of the level affects the parameter adjustment value. In the example of FIG. 4, the level of the weapon W3 is 4. Further, in the example of FIG. 4, the level of the weapon P3 is 2. The value of the level is raised as a user upgrades the item. An item can be upgraded, for example, through composition using other item that may be an ingredient of the item.

The parameter adjustment value is one type of the status. The parameter adjustment value indicates a value for adjusting the parameter of the character equipped with an item. In the example of FIG. 4, the parameter adjustment values of the weapon W3 are "AT: +50" and "MP: +100". This means that the AT of the character equipped with the weapon W3 is increased by 50. Further, the MP of the character equipped with the weapon W3 is increased by 100. Therefore, it is advantageous for a user who wishes completion of a game content to have a user's character be equipped with an item with which the status is largely increased with the parameter adjustment value.

Screen Display Example

Figure 5:
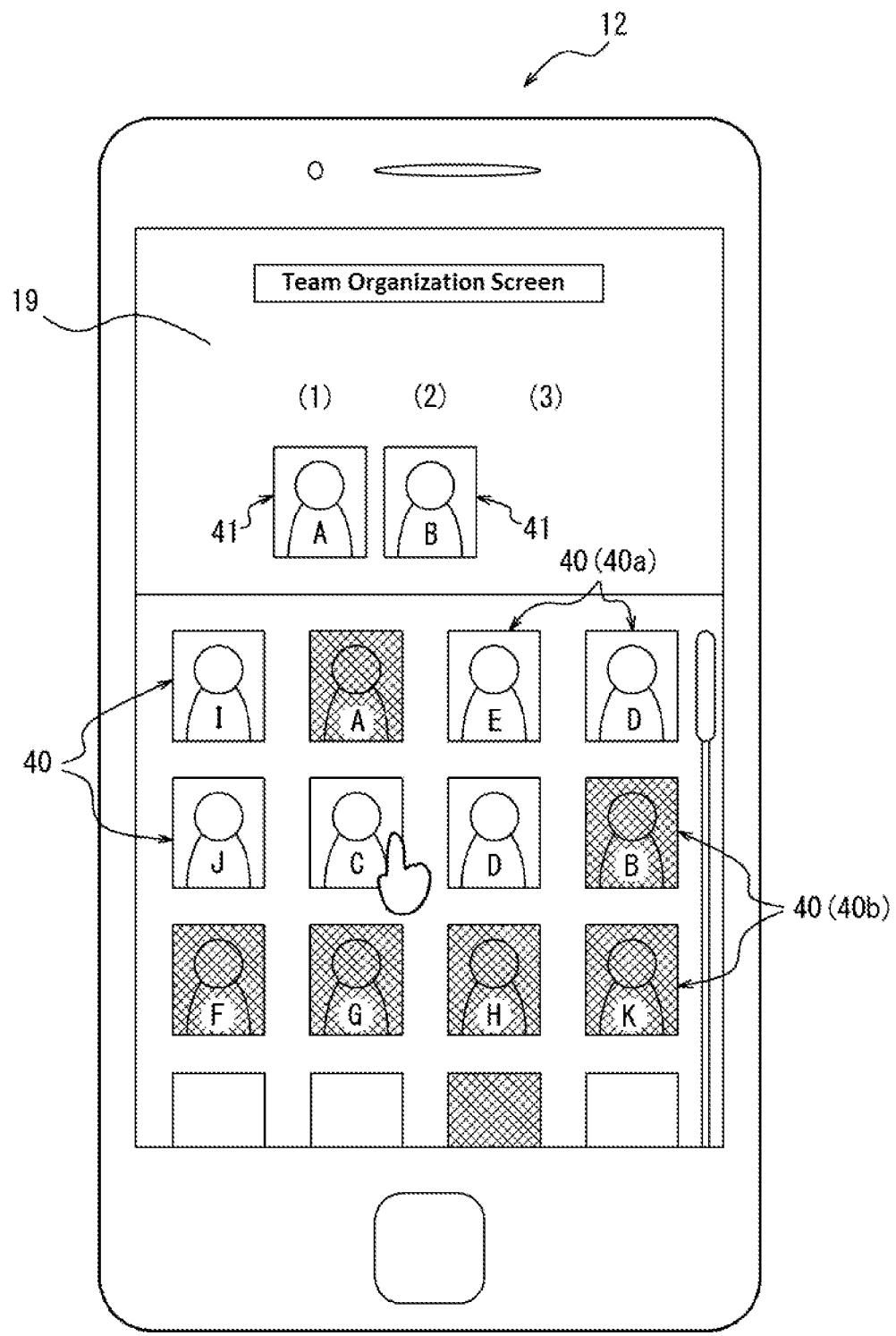
FIG. 5 illustrates an example of a team organization screen.

FIG. 5 illustrates an example of a screen on which a user organizes a team. A user who plays a consecutive battle quest is able to organize a team to participate in a battle on the team organization screen. The consecutive battle quest is one of battle contents and is one type of battle quests in which battles are executed consecutively. In the consecutive battle quest, the user switches characters that are associated with a plurality of possessed cards in each stage to play the battles. In the continuous battle quest, a plurality of stages in which battles with enemy characters are carried out are provided. The plurality of stages may include, for example, a battle stage in which a battle is performed, a rest stage in which characters are allowed to rest, and a breakpoint which will be described later. In the embodiment, when a user advances his/her team to the rest stage or the break point, the user is able to organize a new team to fight at the next battle stage on the team organization screen. For example, in consecutive battle stages, the user plays with the same team as the previous stage. When the team reaches the rest stage, the number of times the characters in the team participate in battles is incremented by one.

The team organization screen displayed on the display unit 19 of the terminal device 12 displays icons 40 of character cards for user's selection at the bottom of the screen. When a user possesses a large number of character cards and all of them cannot be shown within one screen, some of the character cards are shown on the screen and the rest of the character cards are displayed by scrolling the viewing area. The team organization screen also displays the team that a user is organizing at the top of the screen. Character cards included in the organizing team are shown in the form of icons 41. By tapping the icon 40 displayed at the bottom of the screen, the user is able to include the tapped character card into the team. In addition, by tapping the icon 41 displayed at the top of the screen, the user is able to remove the tapped character card from the team. The team consists of up to three characters.

In the consecutive battle quest in the embodiment, users aim at clearing the stages as many as possible by using their owed game mediums. In the consecutive battle quest, the team can not include the help character. A user advances the consecutive battle quest in accordance with the strategy of including the possessed game medium(s) in the team at an appropriate timing so that the battle becomes advantageous for the user. Here, the game mediums include characters and items (for example, weapons, armor and the like). In the consecutive battle quest, an item is attached to a specific character and a user is unable to attach the item to other characters. Therefore, which item should be attached to the character is one of the important strategies for the user in the consecutive battle quest.

The team organization screen bars the user from choosing a character card that has been already selected for the team, a character card in the state where the character is incapacitated, a character card that has reached the upper limit of the number of times the character participates in battles, and the like. For example, to make such cards unelectable, the cards may be grayed out, a note indicating that selection cannot be made may be added, or the card may be hided. In the embodiment, the consecutive battle quest limits the number of times that each character joins a battle. The upper limit of the number of times a character participate in a battle may be determined for each character card. In addition, the upper limit of the number of times a character joins a battle may be same (for example, twice) for each character. In the example of FIG. 5, icons 40*b* of the character cards that the user cannot select are shown in gray. The user selects icon(s) 40*a* of selectable character card(s) to organize the team. In the example of FIG. 5, the user adds a character A and a character B into the team ((1) and (2) at the top of the screen).

Figure 6:
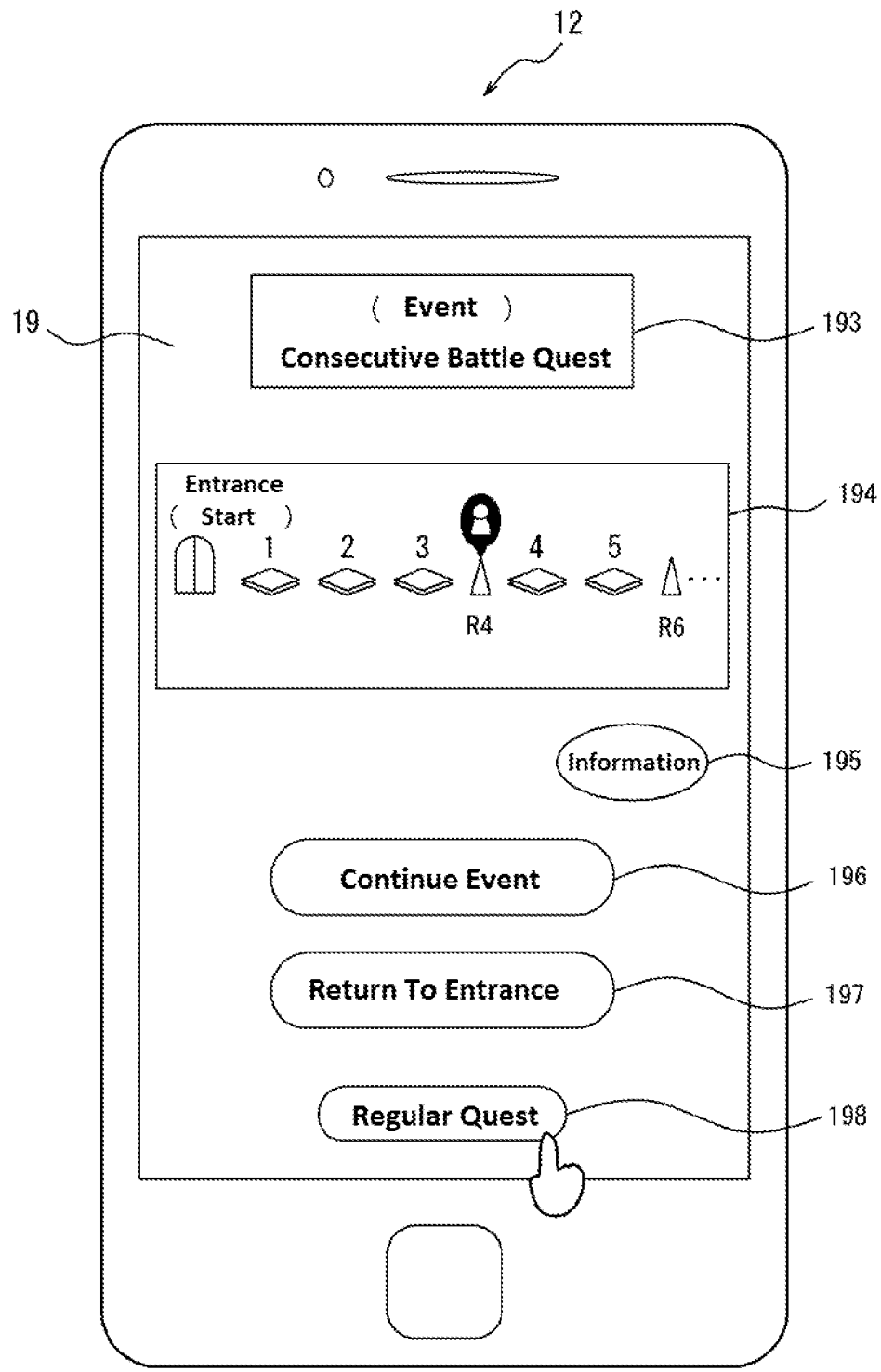
FIG. 6 illustrates an example of a start screen of a consecutive battle quest.

FIG. 6 schematically illustrates a start screen (top screen) of the consecutive battle quest in the embodiment. The top screen shown in FIG. 6 includes a title display 193, a map display 194, an information button 195, a continue button 196, a reset button 197, and a select button 198.

The title display 193 indicates that the quest which the user plays is a consecutive battle quest. In addition, the title display 193 also indicates that the consecutive battle quest is one of events different from the regular quest. Here, in the embodiment, the regular quest is battle content based on a main story of the game.

The map display 194 displays a map of a stage of the consecutive battle quest. In the example of FIG. 6, an entrance (start) is represented by an image of a gate. Also, the battle stages are represented by images of a diamond. In addition, each battle stage is numbered indicating the order of the stages. Hereinafter, the battle stage having the number 1 is denoted as the "battle stage 1".

Also, the rest stages are represented by images of a triangle. In addition, each rest stage is marked with a symbol. The symbol of the rest stage is formed by a combination of "R" and the number of the next battle stage. Hereinafter, the rest stage marked with R4 is denoted as the "rest stage R4."

The stage where the team is located is marked with an image representing a person. In the example of FIG. 6, the team of the user clears the battle stages 1 to 3 and proceeds to the rest stage R4. As described above, when the team reaches the rest stage, the number of times the characters in the team participate in battles is incremented by one. For example, when the team remains the same from the start and the team reaches the rest stage R6, the number of times the characters in the team participate in a battle is turned to two. Here, how to count the number of times a character participates in a battle is not limited to the above. When the team battles at the battle stage, the number of times the characters participate in a battle may be increased by 1, regardless of winning or losing the battle. In this case, even when the team gives up the battle stage halfway through, the number of times may be incremented by 1 and the team may return to the point just before the battle stage.

Here, in the consecutive battle quest of the embodiment, the break point is provided for every 20 battle stages. At the breakpoint, the number of times that the characters participate in a battle and the incapacitated state of all the characters associated with the cards are reset. On the team organization screen at the break point, all the character cards are selectable for a team. That is, in the screen example of FIG. 5, there is no icon 40*b* displayed in gray, and only the icons 40*a* of the selectable character cards are displayed.

When the information button 195 is tapped by a user, strategy information on the battle stages in the consecutive battle quest is displayed. The strategy information is information that helps the user to fight a battle advantageously. For example, the strategy information may include information about attributes of enemy characters at the forthcoming battle stages. When the user taps the information button 195, for example, it may be displayed that enemy characters in the battle stages 4 and 5 have a fire attribute. At this point, the user may select characters that have a water attribute for his/her team in order to fight the battles advantageously.

When the continue button 196 is tapped by a user, the user can return to the consecutive battle quest. When the user taps the continue button 196, for example, the team organization screen (see FIG. 5) may be displayed. Then, the user may resume the battle stage 4 after completing the team organization. When the user clears the battle stage 4, the battle stage 5 is subsequently started. When the user clears the battle stage 5, the team goes to the rest stage R6. Here, characters that have been incapacitated in the battle stage 4 or 5 cannot be included in the team until their incapacitated state is reset.

When the reset button 197 is tapped by a user, the team is returned to the entrance (start). Here, like the break point, the number of times that the characters participate in a battle and the incapacitated state of all the characters associated with the cards are reset. On the team organization screen at the entrance, all the character cards are selectable to organize a team. In the example of FIG. 6, the reset button 197 is displayed as "return to entrance." Here, when the team passed at least one break point, the display of the reset button may be changed as "Return to previous break point." For example, if the team has advanced to a battle stage 45, the team may return to the previous break point (a break point between the battle stage 40 and the battle stage 41) when the user taps the reset button 197. When the user further taps the reset button 197 in this state, the team may further return to another previous break point (a break point between the battle stage 20 and the battle stage 21), and the display of the reset button 197 may be changed as "return to the entrance."

When a user taps the select button 198, the content of the game is switched from the consecutive battle quest to the regular quest. Even if a user taps the select button 198 and plays the regular quest, user's progress status in the consecutive battle quest is maintained. Moreover, from the regular quest, the top screen of the game, or the menu screen of the game, a user can return to the top screen of the consecutive battle quest again. In the example of FIG. 6, the user can resume the consecutive battle quest from the rest stage R4. Here, the top screen of the consecutive battle quest may further include a button for switching to at least one of the top screen of the game and the menu screen of the game. In addition, the top screen of the consecutive battle quest may further include a button for returning to the previous screen.

Figure 7:
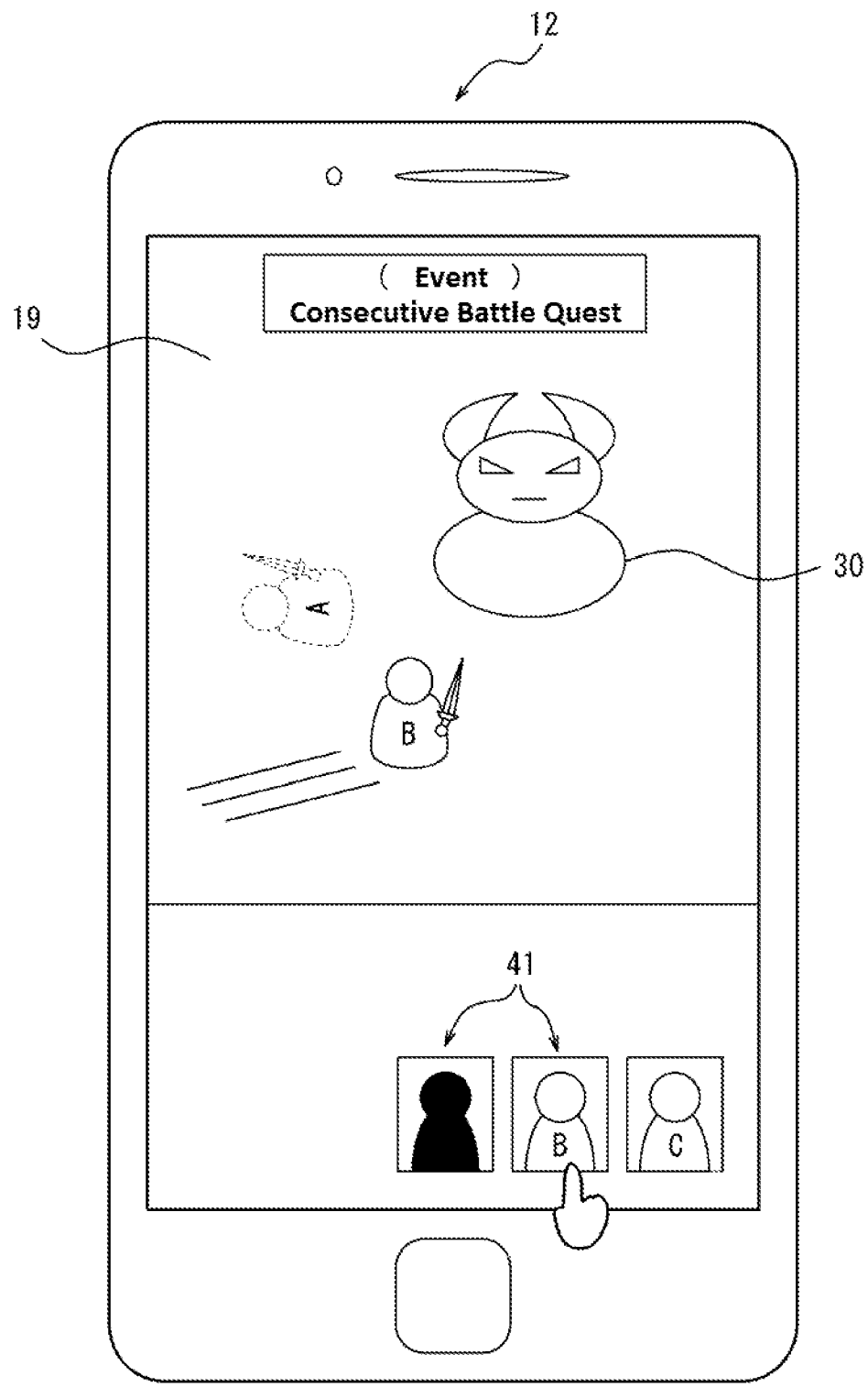
FIG. 7 illustrates an example of a battle screen of a consecutive battle quest.

FIG. 7 schematically illustrates an example of a screen of the consecutive battle quest in the embodiment. As shown in FIG. 7, a screen of the battle stage includes a field area situated in the upper part of the screen and an area other than the field situated in the lower part of the screen. The field area is an area for displaying a virtual game space. For example, an enemy character 30 and the character B operated by the user are displayed in the field area. The area other than the field is an area for displaying an image(s) related to a user's operation(s). For example, the icon 41 of the character of the card included in the team is displayed in the area other than the field.

In the example of FIG. 7, the user operated the character A displayed in the field area to advance the game (more specifically, the user was battling with the enemy character 30). However, the character A was incapacitated and the icon 41 of the character A in the area other than the field was displayed in black. Then, the user tapped the icon 41 of the character B and switched the operation target from the character A to the character B. The incapacitated character A cannot participate in a battle until the team reaches the breakpoint or until the user gives up on continuing the current consecutive battle quest by pressing the reset button 197 (see FIG. 6).

Restriction on Switching Quest

Here, as shown in FIG. 6, a user is able to switch to the regular quest while maintaining the progress status of the consecutive battle quest by the switching button 198 in the embodiment. It is preferable for a user that the user is able to play the regular quest in parallel even while the user is advancing the continuous battle quest. Generally, a user is allowed to change the equipment of the characters in the team in the regular quest.

However, in the consecutive battle quest, the number of times that each character joins a battle is limited. In addition, in the consecutive battle quest, there is a restriction that a character that has once been incapacitated is not allowed to participate in a battle again until it reaches the break point or the like. Considering such restrictions, which character and which timing the character should participate in a battle may be an important game strategy in the consecutive battle quest.

However, if a user is allowed to freely change the settings of characters in a regular quest, for example, the user is able to switch a weapon and the like of a character that is capable of fighting in the consecutive battle quest by a weapon and the like of another character that is no longer able to fight in the consecutive battle quest, and then return to the consecutive battle quest again, In this way, even a beginner user can fight a battle advantageously since he/she can have a specific advantageous weapon and the like. If it is possible to switch weapons and the like in this manner, the importance of the strategy in the consecutive battle quest decreases, which may hinder enhancement of the attractiveness of the game. Moreover, the value of many game mediums that non-beginner users have collected may be deteriorated. For these reasons, hereunder described restrictions are imposed when users switch from the consecutive battle quest to a quest other than the consecutive battle quest (for example, the regular quest) in the embodiment.

Figure 8:
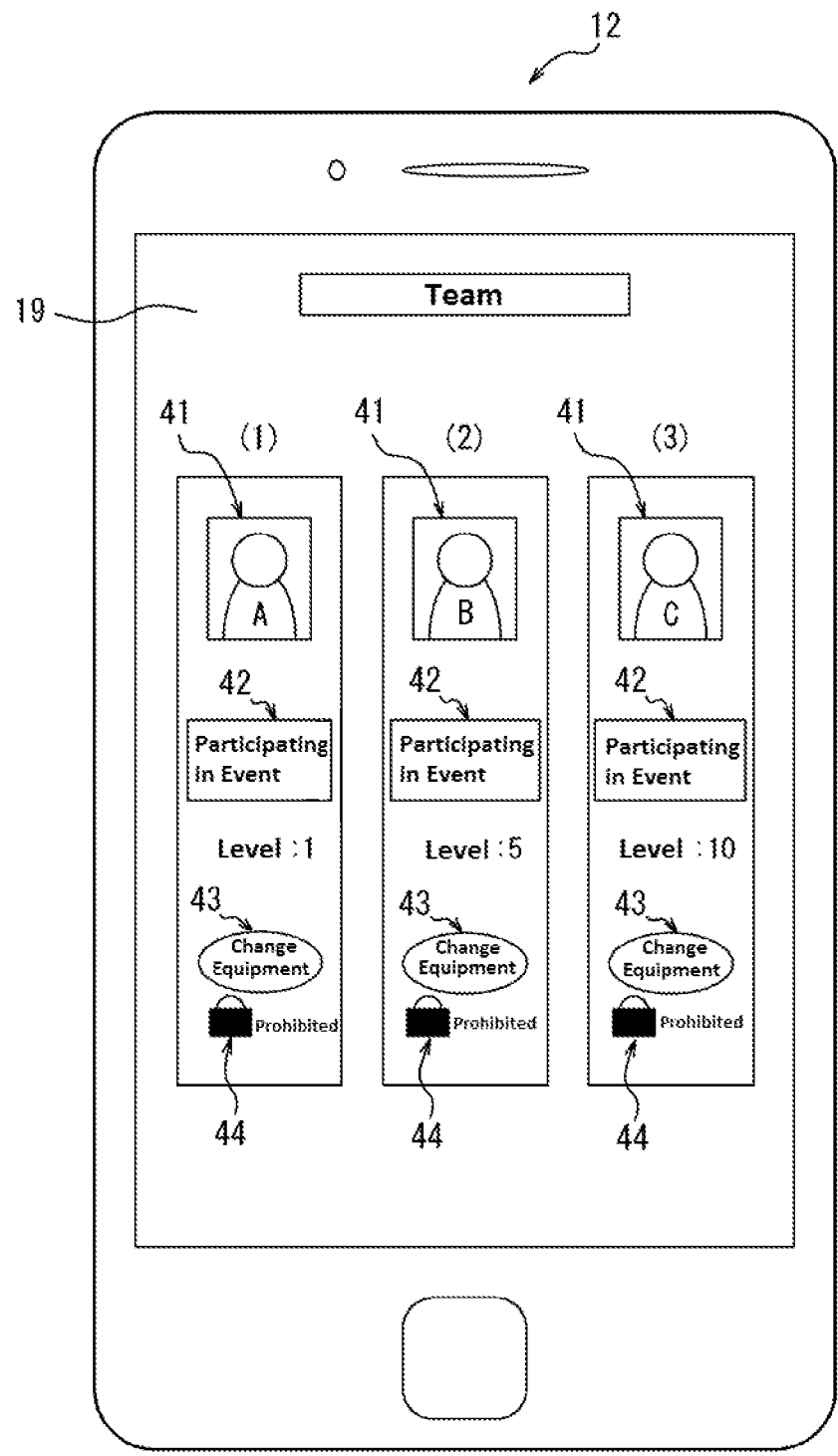
FIG. 8 illustrates an example of a screen on which a team is shown.

FIG. 8 shows an example of a team display screen in the embodiment. A screen may be switched to the team display screen directly from a screen of the regular quest. In addition, a screen may be switched to the team display screen from a screen of the regular quest, or through the top screen of the game or the menu screen of the game.

The team display screen shows information on characters in a team. As shown in FIG. 8, the icons 41 of the characters A to C in the team and a message 42 indicating that the user is participating in the event (that is, consecutive battle quest) are displayed. Further, as shown in FIG. 8, for each of the characters A to C, an equipment change button 43 is provided.

Here, if the user is allowed to change the equipment of the characters A to C by the equipment change button 43 while the user is participating in the consecutive battle quest, switching of the equipment is possible. For example, if the character A is incapacitated in the consecutive battle quest (see FIG. 7) and the user can attach a strong weapon worn by the character A to the character B that is capable to fight a battle, the importance of the strategy (the strategy of choosing the timing to incorporate such a character into the team) in the game decreases, which may hinder enhancement of the attractiveness of the consecutive battle quest.

To address this, as shown in FIG. 8, a key icon 44 indicating that the equipment change is inhibited is displayed in conjunction with the display of the message 42. At the same time, the equipment change button 43 is disabled (the screen for changing the equipment will not be displayed even when the user taps the button).

Here, if the user desires to change the equipment of the characters A to C using the equipment change button 43, it is necessary for the user to dissolve the state where the user is participating in the consecutive battle quest. By tapping the reset button 197 on the top screen of the consecutive battle quest, the user can dissolve the state where the team is participating in the consecutive battle quest. A screen may be switched to the top screen of the consecutive battle quest directly from a screen of the regular quest. In addition, a screen may be switched to the top screen of the consecutive battle quest through the top screen of the game or the menu screen of the game from a screen of the regular quest.

Figure 9:
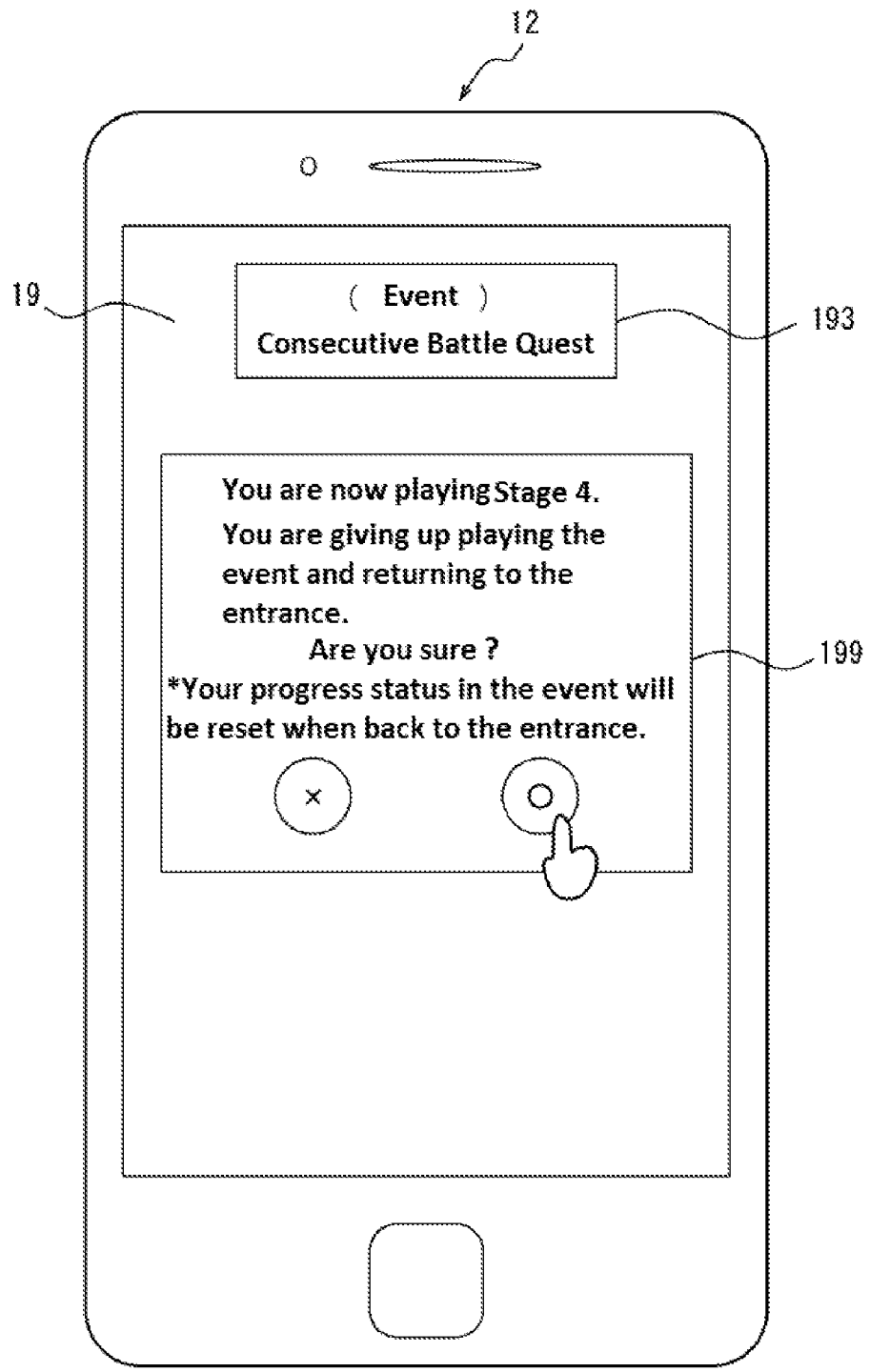
FIG. 9 illustrates an example of a screen on which a user resets a consecutive battle quest.

FIG. 9 illustrates an example of a screen (a reset screen) on which a user resets a consecutive battle quest. As shown in FIG. 9, the reset screen includes a title display 193 and a confirmation display 199. The title display 193 is the same as that in FIG. 6, so its description will be omitted.

The confirmation display 199 displays a message confirming to the user about resetting the progress state of the consecutive battle quest. In addition, the confirmation display 199 includes a button (○) for executing the reset and a button (x) for canceling the reset. When the user taps the button for executing the reset on the reset screen, the user can dissolve the state where the team is participating in the consecutive battle quest.

Figure 10:
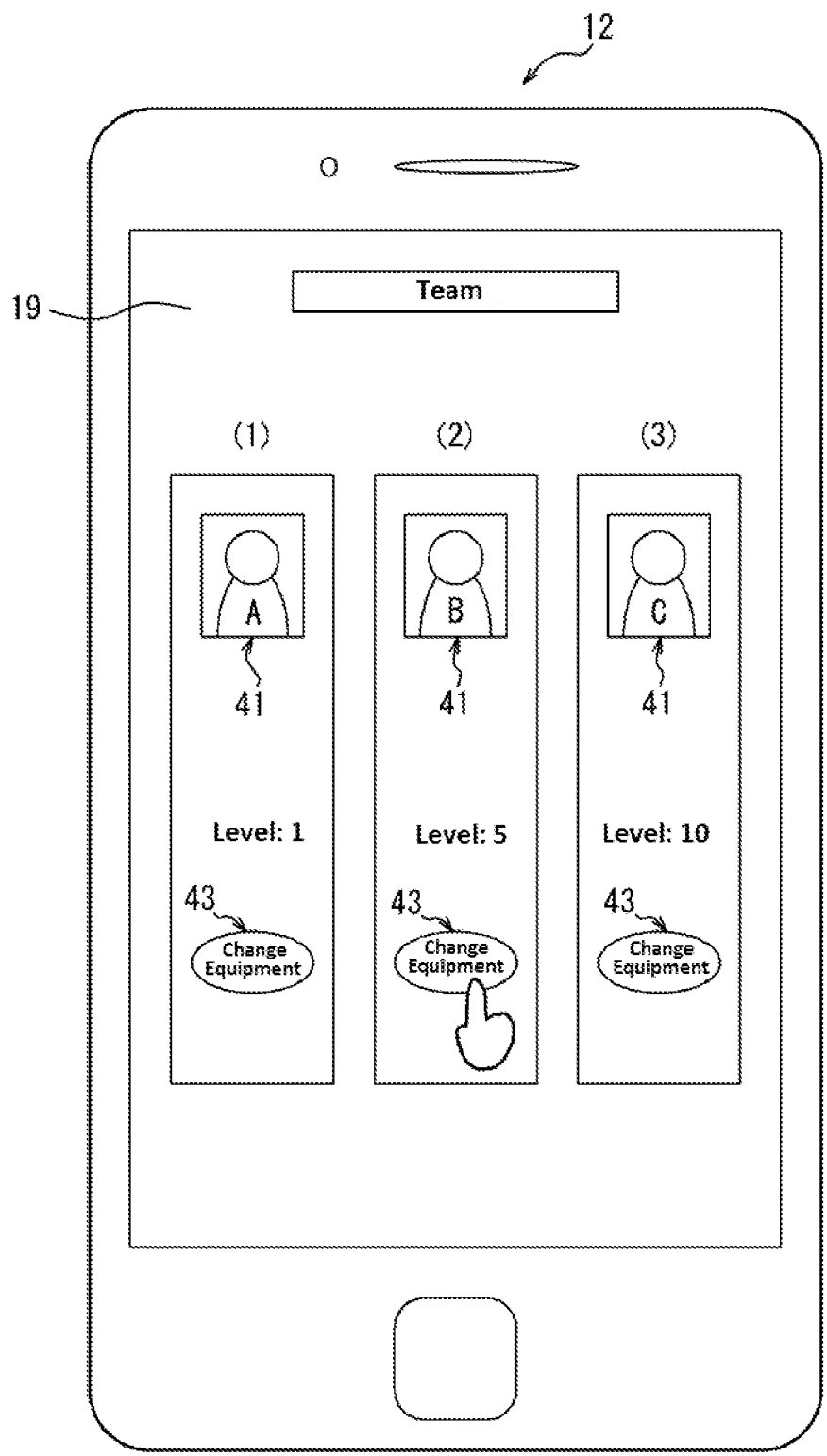
FIG. 10 illustrates an example of a screen on which a team is shown when a user resets a consecutive battle quest.

FIG. 10 shows an example of a display screen of the team when the participating state in the consecutive battle quest is resolved Compared with FIG. 8, the message 42 indicating that the user is participating in the event (that is, the consecutive battle quest) is not displayed in FIG. 10. In addition, in FIG. 10, the key icon 44 indicating that the equipment change is inhibited is not displayed and the equipment change button 43 is enabled. By tapping the equipment change button 43, the user can switch a screen to the screen for changing equipment of characters.

Here, as described above, when the team has advanced to the breakpoint in consecutive battle quest, the incapacitated state of the character associated with the card and the number of times that the character participates in a battle are reset. That is, since it is possible to reconfigure associations between characters and items at this point in the consecutive battle quest, there is no need to maintain associations between characters and items in the regular quest. Also, when a team completes the consecutive battle quest (in other words, when all the stages are cleared), there is no need to maintain the associations between the characters and the items in the regular quest. Therefore, when the user switches to the regular quest after the team has advanced to the breakpoint or the goal in the consecutive battle quest, and then displays the team display screen, the screen of FIG. 10 (the equipment change button 43 is enabled) is displayed.

In the embodiment, when the user switches to the regular quest (an example of a second quest) from the consecutive battle quest without satisfying a predetermined condition in the consecutive battle quest (an example of a first quest), a restriction that the user has to play the regular quest while he/she maintains the associations between the characters in the team (an example of a first game medium) and the items such as the weapon, the armor (an example of a second game medium). Thus, when the user returns to the consecutive battle quest and resumes, the associations between the characters and the items are maintained. Therefore, the importance of the strategy in the game is not reduced in the consecutive battle quest. Here, the predetermined condition is reset of the consecutive battle quest, completion of the consecutive battle quest (goal), or advancement of the character to the break point set in the consecutive battle quest.

Here, what is maintained (constrained) between the consecutive battle quest and the regular quest is the associations between the characters and the items. Therefore, for example, an incapacitated state of a character in the consecutive battle quest is not maintained in the regular quest. Also, for example, the level or the parameter of a character in the consecutive battle quest is not carried over into the regular quest. That is, when switching from the consecutive battle quest to the regular quest, the state of the character itself is not maintained. For example, it is possible for a user to use a character that has been incapacitated in the consecutive battle quest as an operation target in the regular quest. Also, it is possible to raise the level and the parameter of a character(s) in the regular quest after switched from the consecutive battle quest.

Also, for example, the level or the status of an item in the consecutive battle quest is not carried over into the regular quest. That is, when switching from the consecutive battle quest to the regular quest, the state of the item itself is not maintained. For example, when a user switches to the regular quest switched from the consecutive battle quest, the user is able to raise the level and status of an item through composition (enhancement composition or evolutionary composition) using other material(s) in the regular quest.

In the embodiment, when a user switches from the consecutive battle quest to the regular quest, a change in the state of a character itself and a change in the state of an item itself are permitted. Therefore, advancement in the regular quest benefits a user to play battle stages of the consecutive battle quest in an advantageous manner, resulting in the cooperation effect of these two quests. Therefore, the attractiveness of the game is further improved.

Flowchart

Figure 11:
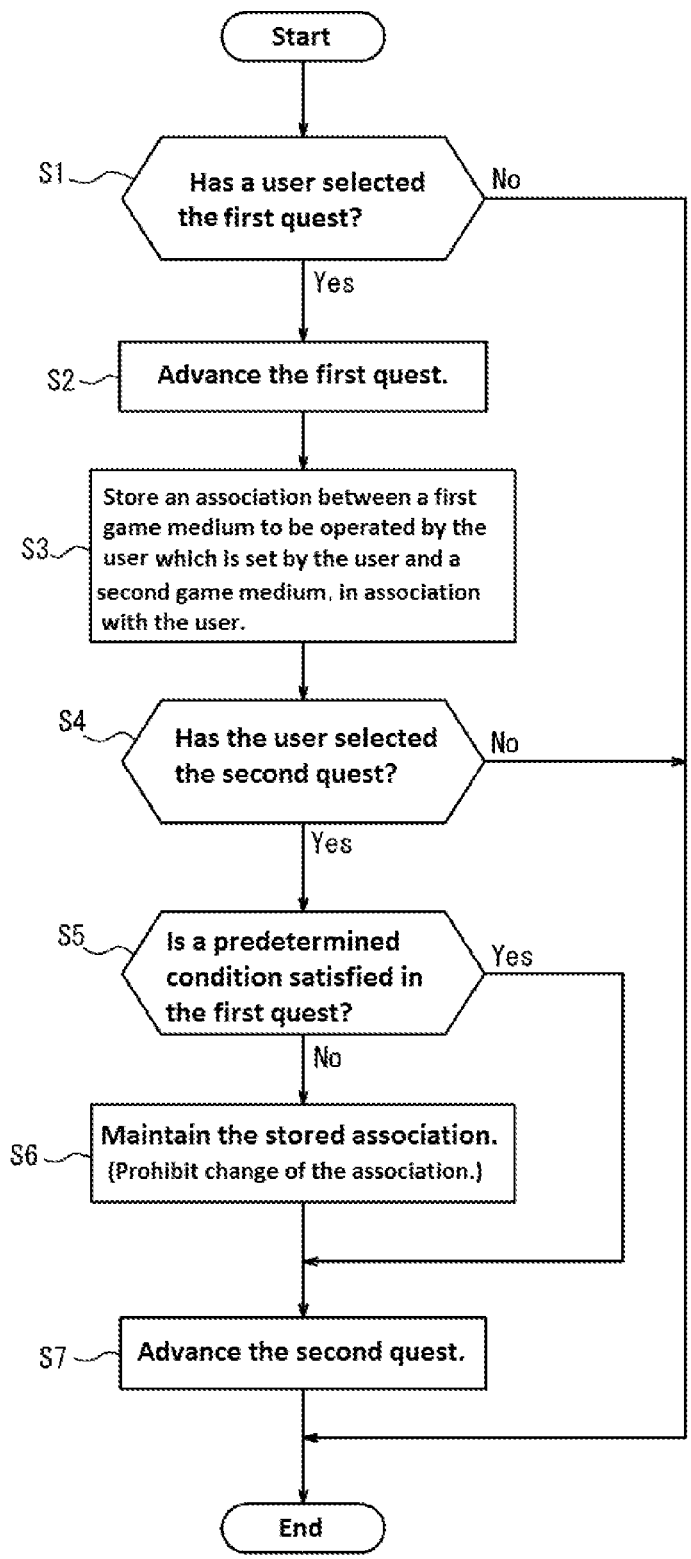
FIG. 11 is a flowchart of a process relating to maintenance of association between characters and items in a consecutive battle quest.

FIG. 11 is a flowchart of a process of maintenance of the associations between characters and items in the consecutive battle quest performed by the terminal device 12. As described above, a user may switch to the regular quest while playing the consecutive battle quest. The flowchart shows processing (control method) of the terminal device 12 in such switching between battle game contents. Here, in the following description of the flowchart, a specific example of the first quest is the consecutive battle quest. Moreover, in the following description of the flowchart, a specific example of the second quest is the regular quest. Here, in the following description of the flowchart, a specific example of the first game medium is the consecutive battle quest. Moreover, in the following description of the flowchart, a specific example of the second game medium is an item such as a weapon and armor.

First, the terminal device 12 determines whether a user of the game has selected the first quest (for example, the consecutive battle quest) (step S1). The user is able to select the first quest or the second quest on the top screen of the game, for example. When the user selects the first quest (Yes in step S1), the terminal device 12 proceeds to processing of step S2. Whereas when the user does not select the first quest (No in step S1), the terminal device 12 ends the process of maintenance of the associations between the characters and the items.

When the first quest is selected, the terminal device 12 advances the first quest (step S2, corresponding to a step of advancing the first quest).

The terminal device 12 stores an association between the first game medium (for example, a character) to be operated by the user and a second game medium, which is set by the user, in association with the user (step S3, corresponding to a first storage step and a first storage control). For example, the terminal device 12 updates, with respect to the characters of the team used in the first quest, the equipment section in the information 111 about owned cards.

Here, when a change in the status of the second game medium (for example, item) occurs while the first quest is in progress, the terminal device 12 may store the information on the change in the status in the terminal storage unit 18 (corresponding to a second storage step). For example, when a change occurs in an item status, the terminal device 12 may update the status of the information 115 about owned items and store it in the terminal storage unit 18. Then, the updated information 115 about owned items may be used when the user plays the second quest (the change in the status of the second game medium stored at the second storage step may be reflected).

Updating of the information 111 about owned cards and the information 115 about owned items may be performed, for example, at the timing when the user finishes one stage in the consecutive battle quest. As another example, updating of the information 111 about owned cards and the information 115 about owned items may be performed at the timing when the user operates the terminal device to switch to the top screen of the first quest (at the timing when the second quest becomes selectable).

The terminal device 12 then determines whether the user has selected the second quest (for example, the regular quest) (step S4). For example, the user can select the second quest on the top screen of the first quest. When the user selects the second quest (Yes in step S4), the terminal device 12 proceeds to processing of step S5. Whereas when the user does not select the second quest (No in step S4), the terminal device 12 ends the process of maintenance of the associations between the characters and the items.

The terminal device 12 then determines whether the user satisfies the predetermined condition in the first quest (step S5). When the predetermined condition is satisfied, the incapacitated state of the first game medium and the number of times that the first game medium participates in a battle in the first quest are reset. That is, when the predetermined condition is satisfied, the user is allowed to change the association between the first game medium and the second game medium in the first quest. Therefore, there is no need to maintain the association stored in step S3 in the second quest (for example, the regular quest). As described above, the predetermined condition in the consecutive battle quest is, for example, reset of the consecutive battle quest, completion of the consecutive battle quest (goal), or advancement of the character to the break point set in the consecutive battle quest. When the user satisfies the predetermined condition in the first quest (Yes in step S5), the terminal device 12 proceeds to processing of step S7. Whereas when the user does not satisfy the predetermined condition in the first quest (No in step S5), the terminal device 12 proceeds to processing of step S6.

If the predetermined condition is not satisfied in the first quest, the terminal device 12 maintains the stored association (step S6). That is, the terminal device 12 prohibits change of the association between the first game medium (for example, a character) and the second game medium (for example, an item). For example, as shown in FIG. 8, the terminal device 12 displays the key icon 44 indicating that the equipment change is not allowed on the team display screen. The terminal device 12 sets the equipment change button 43 on the team display screen to disabled (the screen for changing the equipment will not be displayed even when the user taps the button).

Whereas when the predetermined condition is satisfied in the first quest, the terminal device 12 does not set the equipment change button 43 to disabled. That is, if the predetermined condition is satisfied in the first quest, the team display screen as shown in FIG. 10 is displayed.

The terminal device 12 advances the second quest (step S7, corresponding to a step of advancing the second quest). Here, in the step of advancing the second quest, the incapacitated state of the first game medium occurred in the step of advancing the first quest is not maintained. That is, the incapacitated state in the first quest does not affect the second quest. Then, the terminal device 12 ends the series of processing.

As described above, an information processing apparatus (for example, the terminal device 12) according to the embodiment is configured to execute processing of a game in which a user is able to select between a first quest (for example, the consecutive battle quest) and a second quest (for example, the regular quest). Further, the information processing apparatus according to the embodiment includes a storage unit (for example, the terminal storage unit 18) and a control unit (for example, the terminal control unit 21). The control unit advances the first quest when the user selects the first quest. Further, the control unit store, in the storage unit, association between a first game medium that is operated by the user (for example, a character associated with a card) and a second game medium that is different from the first game medium (for example, an item including a weapon and armor) in association with the user. Further, when the user selects the second quest by switching from the first quest without satisfying a predetermined condition in the first quest (for example, reset or completion of the first quest), the control unit maintains the stored association and proceeds with the second quest. Since the information processing apparatus according to the embodiment allows a user to play another quest (the second quest) other than the first quest while the first quest is executed under an appropriate restriction (for example, the association between the first game medium and the second game medium made in the first quest is maintained), it is possible to enhance the attractiveness of the first quest.

Alternatively, as a comparative example, for each first game medium, association with the second game medium in the first quest and association with the second game medium in the second quest may be separately performed. That is, association with the second game medium may be individually performed for each quest. However, the first game medium is generally a character or the like so that many kinds exist. If such associations are individually set, it is necessary to store associations of each first game medium for each quest in the storage unit. Moreover, if an event (new quest) is added, the required storage capacity will increase greatly. On the other hand, in the embodiment, the storage capacity does not increase significantly.

In the embodiment, when a user switches from the first quest to the second quest, change in the state of a character itself and a change in the state of an item itself are permitted. Therefore, advancement in the second quest benefits a user to play battle stages of the first quest in an advantageous manner, resulting in the cooperation effect of these two quests. Therefore, the attractiveness of the game is further improved.

Although the present disclosure has been described with reference to the accompanying drawings and embodiment, it should be noted that various changes and modifications can be made as would be understood by one of ordinary skill in the art based on the disclosure. Therefore, any such changes and modifications are intended to be included within the spirit and scope of the present disclosure. For example, a function and the like included in each means, each step and the like can be relocated as long as it does not logically contradict, and a plurality of means or steps may be combined into a single means or step or may be divided.

Modification Examples

In the above embodiment, a user was allowed to perform composition (enhancement composition or evolutionary composition) of an item(s) when the user switches from the consecutive battle quest to the regular quest. Here, selling of items may be possible. Also, items may be usable as ingredients or materials for composition. In these cases, association between a character and an item may be maintained even when the item is lost. Since the item is not be attached to another character even in these cases, so the importance of the game strategy in the consecutive battle quest is not decreased.

In the above embodiment, a part of the game screen may be displayed on the display unit 19 of the terminal device 12 based on data generated by the server device, and another part of the game screen may be native-displayed by a native application installed in the terminal device 12. In this manner, the game according to the above-described embodiment may be a hybrid game in which the terminal device 12 and the server device 11 respectively carry out a part of the processing.

Further, for example, a computer, a mobile phone, or the like can be adequately used to make it function as the terminal device 12 or the server device 11. The terminal device 12 or the server device 11 stores a program that describes processing contents for realizing each of the above-described functions in an accessible storage unit, and it can realize the functions by reading and executing the program by a CPU.

What is claimed is:

1. A computer-readable tangible non-transitory storage medium that provides reduced storage requirements for processing of a game, wherein a user is able to select between a first quest and a second quest in which the user may not switch game medium associations in the first quest and may switch game medium associations in the second quest, and wherein the user is able to switch between the first quest and the second quest without losing game progress in either the first quest or the second quest, comprising executable instructions that, when executed, cause an information processing apparatus to perform operations comprising:

advancing the first quest when the user selects the first quest;

storing an association between a first game medium and a second game medium different from the first game medium, the first game medium being set as an object to be operated by the user in the first quest, and wherein the user is not able to switch the association between the first game medium and the second game medium at all points in the first quest and is able to switch the association between the first game medium and the second game medium in the second quest;

determining, upon a request from the user for switching from the first quest to the second quest, whether a predetermined condition in the first quest is satisfied, wherein the predetermined condition comprises whether the user has advanced to a point in the first quest where the user is able to switch the association between the first game medium and the second game medium;

prohibiting a change of the association between the first game medium and the second game medium responsive to determining that the predetermined condition in the first quest is not satisfied; and advancing the second quest in response to the request from the user while maintaining the association between the first game medium and the second game medium and maintaining a point of advancement of the user in the first quest responsive to determining that the predetermined condition in the first quest is not satisfied.

2. The computer-readable tangible non-transitory storage medium of claim 1, wherein:
the first quest is a battle quest in which the first game medium fights a battle, and
advancing the second quest does not maintain an incapacitated state of the first game medium that occurred in during advancement of the first quest.

3. The computer-readable tangible non-transitory storage medium of claim 1, wherein:
the first game medium is one of a plurality of first game mediums owned by the user to fight a battle,
the first quest is a battle quest in which the user switches between the plurality of first game mediums owned by the user to fight the battle, and
a change of the association is allowed in the first quest when the predetermined condition in the first quest is satisfied.

4. The computer-readable tangible non-transitory storage medium of claim 1, wherein the operations further comprise:
storing a change in a status of the second game medium occurred in the first quest, wherein advancing the second quest includes advancing the second quest with the change in the status of the second game medium.

5. The computer-readable tangible non-transitory storage medium of claim 1, wherein the predetermined condition is a reset of the first quest, completion of the first quest, or the first game medium advancing to a break point set in the first quest.

6. A control method for an information processing apparatus for that provides reduced storage requirements for processing of a game, wherein a user is able to select between a first quest and a second quest in which the user may not switch game medium associations in the first quest and may switch game medium associations in the second quest, and wherein the user is able to switch between the first quest and the second quest without losing game progress in either the first quest or the second quest, comprising:
advancing the first quest when the user selects the first quest;
storing an association between a first game medium and a second game medium different from the first game medium, the first game medium being set as an object to be operated by the user in the first quest, and wherein the user is not able to switch the association between the first game medium and the second game medium at all points in the first quest and is able to switch the association between the first game medium and the second game medium in the second quest;

determining, upon a request from the user for switching from the first quest to the second quest, whether a predetermined condition in the first quest is satisfied, wherein the predetermined condition comprises whether the user has advanced to a point in the first quest where the user is able to switch the association between the first game medium and the second game medium;

prohibiting a change of the association between the first game medium and the second game medium responsive to determining that the predetermined condition in the first quest is not satisfied; and advancing the second quest in response to the request from the user while maintaining the association between the first game medium and the second game medium and maintaining a point of advancement of the user in the first quest responsive to determining that the predetermined condition in the first quest is not satisfied.

7. An information processing apparatus that provides reduced storage requirements for processing of a game, wherein a user is able to select between a first quest and a second quest in which the user may not switch game medium associations in the first quest and may switch game medium associations in the second quest, and wherein the user is able to switch between the first quest and the second quest without losing game progress in either the first quest or the second quest, the information processing apparatus comprising:
a storage unit; and
a control unit, wherein the control unit causes to:
advance the first quest when the user selects the first quest;
store an association between a first game medium and a second game medium different from the first game medium, the first game medium being set as an object to be operated by the user in the first quest, and wherein the user is not able to switch the association between the first game medium and the second game medium at all points in the first quest and is able to switch the association between the first game medium and the second game medium in the second quest;

determine, upon a request from the user for switching from the first quest to the second quest, whether a predetermined condition in the first quest is satisfied, wherein the predetermined condition comprises whether the user has advanced to a point in the first quest where the user is able to switch the association between the first game medium and the second game medium;

prohibit a change of the association between the first game medium and the second game medium responsive to determining that the predetermined condition in the first quest is not satisfied; and advance the second quest in response to the request from the user while maintaining the association between the first game medium and the second game medium and maintaining a point of advancement of the user in the first quest responsive to determining that the predetermined condition in the first quest is not satisfied.

8. The computer-readable tangible non-transitory storage medium of claim 1, wherein the association between the first game medium and the second game medium is maintained in response to determining that the predetermined condition in the first quest is not satisfied by precluding the user from altering the association between the first game medium and the second game medium.

\* \* \* \* \*